United States Patent [19]

Isayama

[11] Patent Number: 4,518,974

[45] Date of Patent: May 21, 1985

[54] INK JET AIR REMOVAL SYSTEM

[75] Inventor: Takuro Isayama, Tokyo, Japan

[73] Assignee: Ricoh Company, Ltd., Japan

[21] Appl. No.: 420,865

[22] Filed: Sep. 21, 1982

[51] Int. Cl.[3] .............................................. G01D 15/18

[52] U.S. Cl. .................................. 346/140 R; 346/75

[58] Field of Search .............................. 346/75, 140 R

[56] References Cited

U.S. PATENT DOCUMENTS

| | | | |
|---|---|---|---|
| 4,034,380 | 7/1977 | Isayama | 346/140 R |
| 4,123,761 | 10/1978 | Kimura et al. | 346/140 R |
| 4,241,406 | 12/1980 | Kennedy et al. | 364/518 X |
| 4,266,232 | 5/1981 | Juliana, Jr. et al. | 346/140 R |
| 4,293,867 | 10/1981 | Isayama | 346/140 R |
| 4,323,908 | 4/1982 | Lee et al. | 346/140 R |
| 4,383,263 | 5/1983 | Ozawa et al. | 346/140 R |
| 4,403,229 | 9/1983 | Bartecu | 346/75 |
| 4,466,005 | 8/1984 | Yoshimura | 346/140 R |

*Primary Examiner*—E. A. Goldberg
*Assistant Examiner*—Gerald E. Preston
*Attorney, Agent, or Firm*—Guy W. Shoup

[57] ABSTRACT

An ink jet printing system for printing an image in the form of dots produced by ink droplets on a recording medium is provided. The present ink jet printing system is characterized by detecting the presence of air bubbles in the ink inside an ink chamber beyond a predetermined level and removing these air bubbles by pulling the air-ink boundary into the ink chamber thereby transferring the air bubbles to the air. The present ink jet printer allows to produce ink droplets of uniform characteristics since air bubbles are removed from the ink as soon as they are detected.

12 Claims, 9 Drawing Figures

INK JET AIR REMOVAL SYSTEM

BACKGROUND OF THE INVENTION

1. Field of the Invention

This invention generally relates to an ink jet printing system, and in particular, to such an ink jet printing system in which air bubbles trapped in the ink inside an ink chamber from which ink is discharged in the form of ink droplets for printing are advantageously removed from the ink chamber to insure constant ink discharging performance at all times.

2. Description of the Prior Art

Various types of ink jet printing systems have heretofore been proposed. In one type of the ink jet printing system, ink droplets are continuously discharged out of a printing head whereby the ink droplets are uniformly charged before being passed between a pair of deflecting electrodes to which signal pulses are applied or the ink droplets are individually charged to the amount in accordance with an image signal before being passed through a pair of uniformly biased deflecting plates. There is another type of the ink jet printing system, which is often referred to as the on-demand type ink jet printer, and, in this type, ink droplets are formed as the ink is discharged out of the ink chamber when the volume inside the ink chamber is reduced, for example, by deflecting a part of the wall defining the ink chamber. In the former case, the ink is discharged out of the ink chamber or nozzle by applying pressure to the ink; on the other hand, in the latter case, the ink is discharged out of the ink chamber by means of volume displacement.

However, if air bubbles are trapped inside the ink, particularly that portion of the ink contained inside the ink chamber, such an air-bubble-containing ink as a whole comes to exhibit compressibility thereby adversely affecting the ink discharge performance. One can think of various causes of such air bubble entrapment; for example, air bubbles may be introduced into the ink inside the ink chamber through the mouth of the ink nozzle which defines the ink chamber, or air bubbles may be generated in the ink as the temperature changes.

FIG. 1 shows in cross-section the ink discharging head to be used in the on-demand type ink jet printing system. As shown, the ink discharging head comprises a nozzle 1 defining an ink chamber 4 for containing a quantity of ink therein. A mouth or ink discharging hole 2 is defined at the forward end of the nozzle 1 through which the ink inside the ink chamber 4 is discharged out into the air as targeted toward a recording medium positioned opposite to the printing head. The nozzle 1 is also provided with another hole in which a pressure member 3 is mounted with its periphery fixed to the circumference of the hole, so that the pressure member 3 constitutes a part of the wall which defines the ink chamber 4. The pressure member 3 is usually formed by overlaying a piezoelectric plate as adhered onto a support plate. Also shown in FIG. 1 is an ink supplying tube 5 which is connected to the inlet side of the nozzle 1.

In operation of the discharging head shown in FIG. 1, electrical pulse signals are applied to the piezoelectric plate of the pressure member 3, so that the pressure member 3 deflects inwardly of the ink chamber 4 in accordance with the applied pulses thereby the ink inside the chamber 4 is pressurized and discharged out into the air through the mouth 2. In this instance, however, if air bubbles 6 are present inside the ink contained in the ink chamber 4, as shown in FIG. 2, the ink which is normally considered incompressible in such application begins to exhibit compressibility due to the existence of air bubbles therein. Under such circumstances, the ink discharging characteristics are severely impaired or no ink is discharged at all even if the pressure member 3 is inwardly deflected in an extreme case.

Therefore it is extremely important to make the ink free of air bubbles in order to insure ink discharging performance in an ink jet printing system. In this regard, several approaches have been proposed to prevent the entrapment of air bubbles during operation or to remove the air bubbles somehow trapped in the ink. However, none of the prior art approaches is satisfactory for various reasons. For example, some prior art approaches only propose to prevent entrapment of air bubbles from the supply side of the ink chamber and others require complicated and bulky devices. Thus there has been a need for the advent of a new approach to cope with the problem of air bubble entrapment into the ink in an ink jet printing system.

SUMMARY OF THE INVENTION

The disadvantages of the prior art are overcome with the present invention and a new ink jet printing system which is capable of keeping the ink free of air bubbles is provided. In accordance with the present invention, detection is made as to the fact that the amount of the air bubbles trapped in the ink has reached a predetermined level, and upon detection, the air bubble removing operation takes place to make the ink free of air bubbles.

The advantages of the present invention are preferably obtained by providing an ink jet printing system for printing an image in the form of dots of ink droplets on a recording medium which comprises a nozzle defining an ink chamber for containing therein a quantity of ink, said nozzle including an ink discharging hole through which the ink is discharged out into the air; an ink reservoir connected to the supply side of said nozzle for supplying ink to said nozzle; ink drive means for driving the ink inside said ink chamber to be discharged through said ink discharging hole; detecting means connected to said ink drive means for detecting the fact that the amount of air bubbles trapped in the ink inside said ink chamber has reached a predetermined level; and drawing means responsive to said detecting means for drawing said ink such that the air-ink boundary is pulled into said ink chamber thereby transferring the air bubbles in said ink to the air, said driving means being returned to its original state after elapsing a predetermined time period so that said ink chamber is filled with ink free of air bubbles.

Preferably, a three-way valve is provided at the intersection among the ink nozzle, the ink reservoir and the drawing means so that the ink may be drawn from and supplied to the nozzle properly. The drawing means preferably includes a piston-cylinder mechanism and its driving circuit which is operated in response to a signal from the air bubble amount detecting means. With such a structure, the piston is retracted to draw the ink thereby causing the air-ink boundary to move into the ink chamber; on the other hand, the piston is advanced to have the ink chamber filled with the ink without air bubbles.

It is therefore an object of the present invention to provide an ink jet printing system for printing an image in the form of dots created by ink droplets on a recording medium with excellent quality.

Another object of the present invention is to provide an ink jet printing system capable of forming ink droplets of desired size at all times.

A further object of the present invention is to provide an ink jet printing system capable of detecting the existence of air bubbles in the ink over a predetermined allowable level and removing the air bubbles from the ink to insure that the ink is virtually free of air bubbles.

A still further object of the present invention is to improve the ink discharging characteristics of an ink jet printing system.

Other objects, advantages and novel features of the present invention will become apparent from the following detailed description of the invention when considered in conjunction with the accompanying drawings.

DESCRIPTION OF THE PREFERRED EMBODIMENTS

Figure 3:
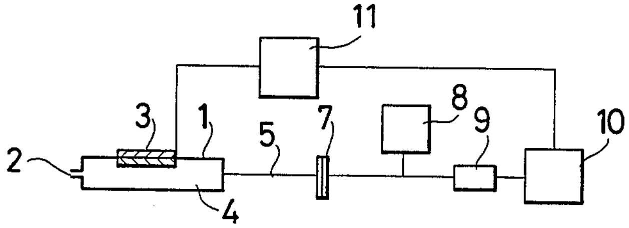
FIG. 3 is a block diagram showing one embodiment of the present invention when applied to the on-demand type ink jet printing system.

Referring now to FIG. 3, there is shown an embodiment of the present invention when applied to the on-demand type ink jet printing system. As shown, the system includes an ink nozzle 1 which defines an ink chamber 4 for containing therein a quantity of ink. An opening or mouth 2 is provided at the forward end of the nozzle 1 for allowing the ink to be discharged out into the air when the pressure member 3 is deflected inwardly to reduce the volume of the ink chamber 4 thereby displacing the ink therein. The supply side of the nozzle 1 is connected from an ink reservoir 8 by means of an ink supply tube 5, and a filter 7 is provided in the tube line to prevent any debris from reaching the nozzle 1. The tube 5 is also connected to an ink drawing device 9 the operation of which is controlled by an ink drawing control circuit 10. Also provided is an ink driving and bubble detecting circuit 11 which is electrically connected to the pressure member 3, which is commonly comprised of a support plate on which is adhered a piezoelectric plate, and to the ink drawing control circuit 10 via lead lines.

In operation, the nozzle chamber 4 is usually filled with ink as supplied from the ink reservoir 8 and thus an ink meniscus is formed at the mouth 2. When a pulse signal is supplied from the circuit 11, the pressure member 3 is inwardly deflected whereby the ink inside the chamber 4 is ejected through the mouth 2 into the air to form an ink droplet. Upon termination of the pulse signal, the pressure member 3 is returned to its original position so that the volume of the chamber 4 is increased whereby the chamber 4 is replenished with ink. Under the circumstances, if the volume amount of air bubbles present in the ink or ink chamber 4 has reached a predetermined level, the ink driving and bubble detecting circuit 11 detects this condition and applies a signal to the control circuit 10 which then actuates the ink drawing device 9 so that the ink inside the chamber 4 is drawn toward the supply side thereby the air-ink boundary is pulled into the chamber 4 to transfer the air bubbles in the ink to the air phase. In this manner, in accordance with the present invention, if the amount of air bubbles in volume has increased beyond a predetermined allowable level, the system carries out the air bubble removing operation to insure the proper formation of ink droplets.

Figure 4:
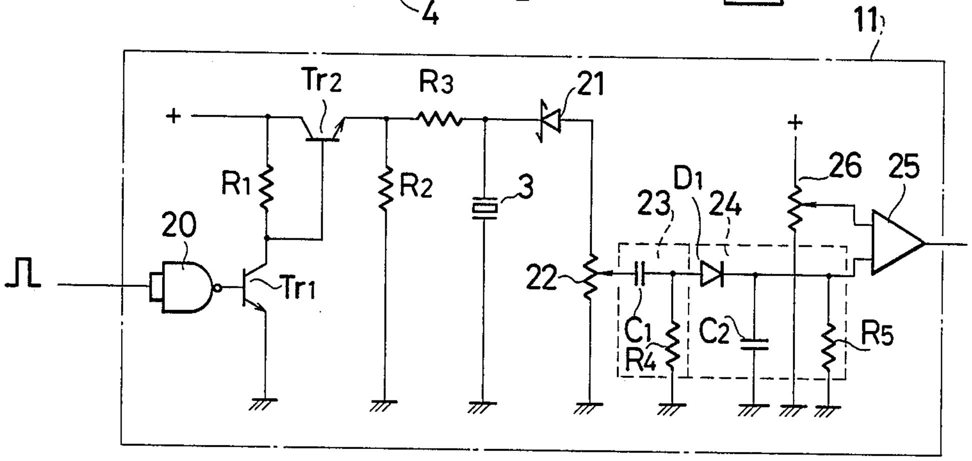
FIG. 4 is a circuit diagram showing the detailed structure of the ink driving and bubble detecting circuit 11 which is used in the system shown in FIG. 3.

FIG. 4 shows the detailed structure of one example of the ink driving and bubble detecting circuit 11 shown in FIG. 3. In FIG. 4, the left hand half, as viewing in the drawing, constitutes the ink driving circuit and the right hand half forms the air bubble detecting circuit. The ink driving portion comprises a NAND gate 20 having its two inputs commonly connected to receive a pulse input signal and its output connected to the base of a NPN transistor $Tr_1$ which has its emitter connected to ground and its collector connected to a positive d.c. voltage source through a resistor $R_1$. The collector of the transistor $Tr_1$ is also connected to the base of a NPN transistor $Tr_2$ having its collector connected to the voltage source and its emitter connected to ground via a resistor $R_2$ and also to one side of the piezoelectric element forming the pressure member 3 via a resistor $R_3$. The other side of the piezoelctric element is connected to ground.

The bubble detecting portion of the circuit 11 comprises a Zener diode 21 having its cathode connected to the junction between the resistor $R_3$ and one side of the piezoelectric element and its anode connected to ground via a variable resistor 22. The pointer of the variable resistor 22 is connected to a filter circuit 23 which includes a capacitor $C_1$ and a resistor $R_4$, and the filter circuit 23 is in turn connected to a rectifying circuit 24 comprised of a diode $D_1$, a capacitor $C_2$ and a resistor $R_5$. The output of the rectifying circuit 24 is connected to one input of a comparator 25 having the other input connected to the pointer of a variable resistor 26 which is connected between the voltage source and ground.

Explaining the operation of the circuit 11 shown in FIG. 4, when a pulse signal of desired pulse width is applied to the input of the NAND gate 20 which functions as an inverter, the transistor $Tr_1$ is turned off and the transistor $Tr_2$ is turned on, so that a high voltage in the form of a voltage pulse is supplied to the top side of the piezoelectric element 3 through the transistor $Tr_2$ and the resistor $R_3$ from the voltage source. Accordingly the piezoelectric element is activated and the pressure member 3 is deflected in a predetermined direction to discharge the ink through the opening 2 into the air. Upon termination of the pulse signal, the transistor $Tr_1$ is turned on to render the transistor $Tr_2$ non-conductive, and thus the charges accumulated at the top side of the piezoelectric element are discharged to ground through the resistors $R_3$ and $R_2$ thereby the pressure member 3 is returned to the original position and thus the additional ink is supplied to the ink chamber 4.

Under the condition, in the case where a significant number of air bubbles are present in the ink chamber 4 or the ink chamber 4 is not completely filled with ink, the impedance against the motion of the pressure member 3 abruptly changes at certain frequencies and peaks appear in the frequency characteristics. For this reason, the piezoelectric element and thus the pressure member 3 is set in a resonant condition at some frequencies. In this instance, the voltage appearing between a pair of terminals of the piezoelectric element is a superposition between the driving pulse and the oscillating component resulting from a resonant condition. Therefore, by detecting the oscillating component, the presence or absence of significant amount of air bubbles inside the ink chamber 4 or the condition of incomplete filling of the chamber 4 with ink can be detected.

The bubble detecting portion of the circuit 11 responds to such an oscillating component as will be fully described hereinbelow. That is, when such an oscillating component is produced, it is level-shifted by the Zener diode 21 and then applied to the variable resistor 22. Then the output from the variable resistor 22 is applied to one input of the comparator 25 after having been filtered by the filter circuit 23 and rectified by the rectifying circuit 24. On the other hand, the other input of the comparator 25 is supplied with a reference voltage to be compared, which is previously adjusted by the variable resistor 26 to a desired value. Thus, it may be so structured that the comparator 25 supplies a high level output when the input voltage from the piezoelectric element becomes larger than the reference voltage. For example, if the reference voltage is set such that the comparator 25 supplies a high level output when the ink discharging performance is deteriorated below a predetermined allowable limit due to production of air bubbles in the ink inside the chamber 4, then a high level signal is output from the comparator 25 when air bubbles are produced in the ink chamber 4 or the chamber 4 is not fully filled with ink.

Figure 5:
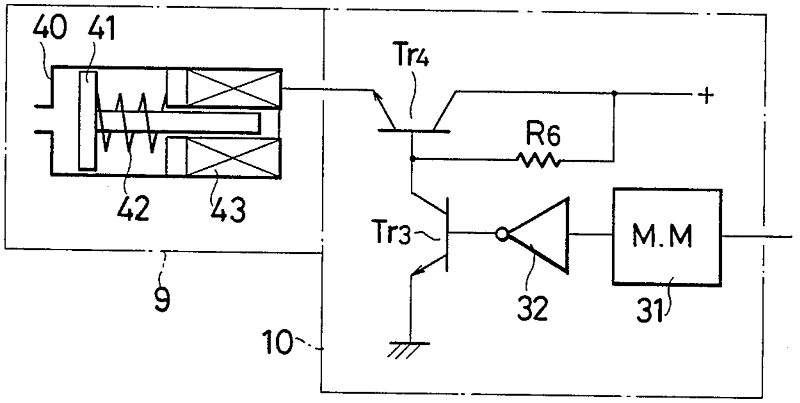
FIG. 5 is a circuit diagram showing the detailed structure of the ink drawing device 9 and its control circuit 10 which are used in the system of FIG. 3.

FIG. 5 shows the detailed structure of one example of the ink drawing device 9 and its control circuit 10. As shown, in this example, the ink drawing device 9 comprises a cylinder 40, which is in fluid communication with the ink chamber 4 through the tube 5, and a piston 41 which is slidably fitted in the cylinder 40. The piston 41 is normally biased toward the left by means of a spring 42. Also provided is a solenoid 43 which will move the piston 41 toward the right or to the retracted position when actuated. On the other hand, the control circuit 10 for controlling the operation of the piston-cylinder mechanism 9 is comprised of a mono-multi-vibrator 31 which receives a signal from the output of the comparator 25. The output of the mono-multi 31 is connected to the base of an NPN transistor $Tr_3$ through an inverter 32. The emitter of the transistor $Tr_3$ is grounded and its collector is connected to the base of an NPN transistor $Tr_4$ having its emitter connected to the solenoid 43 of the ink drawing device 9 and its collector connected to the voltage source with a resistor $R_6$ connected between its collector and base.

Figure 6:
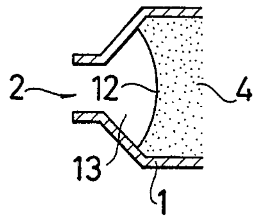
FIG. 6 is a schematic illustration showing the mouth section of the ink nozzle when the ink is drawn by the ink drawing device so that the air-ink boundary is pulled into the ink chamber to transfer air bubbles in the ink to the air.

Now, the operation of the structure shown in FIG. 4 will be explained below. As described previously, when the amount of air bubbles inside the chamber 4 has exceeded an allowable limit, the comparator 25 supplies a high level output which is then fed to the mono-multi 31. Thus the mono-multi 31 is turned on for a predetermined period of time during which the transistor $Tr_3$ is kept off and the transistor $Tr_4$ is kept on and thus the solenoid 43 is energized to move the piston 41 toward the retracted position. This then causes the ink inside the chamber 4 to be moved toward the supply side and the air-ink boundary 12 is pulled into the chamber 4 from the mouth 2 as best shown in FIG. 6. As is obvious, the amount of travel of the air-ink boundary 12 is determined by the stroke of the piston 41.

Figure 1:
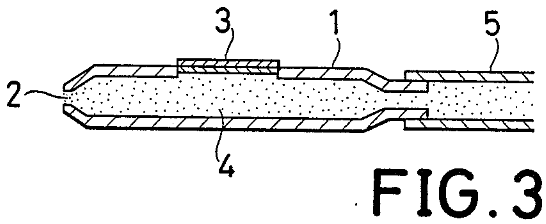
FIG. 1 is a cross-sectional view showing the ink discharging head for use in the on-demand type ink jet printer.
Figure 2:
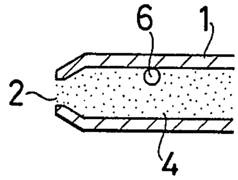
FIG. 2 is a fragmentary view in cross-section of the ink nozzle showing the state that the air bubble 6 is trapped in the ink.
Figure 7:
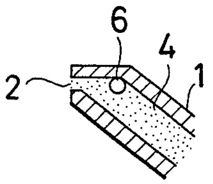
FIG. 7 is a schematic illustration showing a modified ink nozzle in which the air bubble 6 is insured to be located near the nozzle mouth for the ease of removal.

As a result, the air bubbles 6 trapped in the ink inside the chamber 4 and located in the neighborhood of the mouth 2 are merged into the air drawn into the chamber 4 via the mouth 2 thereby forming a void space 13 filled with air in the vicinity of the mouth 2. It is to be noted that in the case of ordinary ink to be used in an ink jet printer, the viscosity is not so high and it is normally in the range between 1.5 and 5 CP, so that air bubbles will not stay floating in the body of the ink but they will move to the highest possible place or come to be in contact with the ceiling of the chamber 4 because of buoyancy as best shown in FIG. 2. Because of this, the chamber 4 may be so structured that air bubbles 6 are collected near the mouth 2 for easy removal from the ink. In this connection, it is preferable to have the nozzle 1 and/or chamber 4 structured as shown in FIG. 7. With such a structure, air bubbles may be securely collected in the vicinity of the mouth 2 and thus the air bubbles may be effectively removed from the ink inside the chamber 4.

After a predetermined period of time has elapsed, the mono-multi 31 is turned off so that the transistor $Tr_3$ is turned on and the transistor $Tr_4$ is turned off thereby deenergizing the solenoid 43. As a result, the piston 41 is moved to the advanced position due to the recovery force of the spring 42. This then causes the air-ink boundary 12 to move towards the mouth 2 of the nozzle 1 and thus the nozzle 1 is again filled with the ink free of air bubbles.

Figure 8:
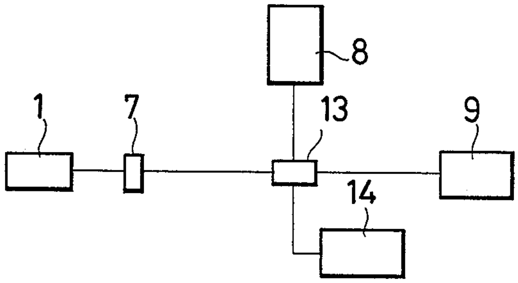
FIG. 8 is a block diagram showing another embodiment of the present invention in which a three-way valve is provided to insure the air bubble removing operation.

FIG. 8 shows another embodiment of the present invention in which a three-way valve 13 is provided at the intersection among the nozzle 1, reservoir 8 and ink drawing device 9 in order to securely carry out the air bubble removing operation. Also provided is a valve control circuit 14 connected to the three-way valve 13 to control its operation. With this structure, the three-way valve 13 is first set in the mode in which the ink drawing device 9 is in fluid communication only with the nozzle 1 whereby the ink is drawn from the nozzle 1 to the device 9 as described above. Then the three-way valve 13 is switched into the mode in which the ink drawing device 9 is in fluid communication with the ink reservoir 8 with the ink drawing device 9 keeping in operation continuously thereby ink is supplied from the reservoir 8 to the ink drawing device 9. Upon termination of the ink drawing operation, the three-way valve 13 is again switched into the mode in which the device 9 is in fluid communication with the nozzle 1, and then the piston 41 of the ink drawing device 41 is allowed to move to the advanced position whereby the ink is supplied to the nozzle 1 to have the ink chamber 4 filled with ink without air bubbles.

It is to be noted that the present invention is not limited to the above-described embodiment which uses the piston-cylinder type ink drawing device. Any other type of ink drawing device may be equally applied. In particular, in the case where the present invention is applied to the on-demand type ink jet printer, the air-ink boundary may be pulled into the ink chamber if a drive pulse having an extremely sharp falling end is repetitively applied to the piezoelectric element of the pressure member 3. The application of such a pulse causes the pressure member 3 to return to its original position abruptly. On the other hand, if ordinary dive pulses are applied to the pressure member 3, the air-ink boundary is gradually moved to the mouth 2 and eventually the ink discharging operation follows.

Figure 9:
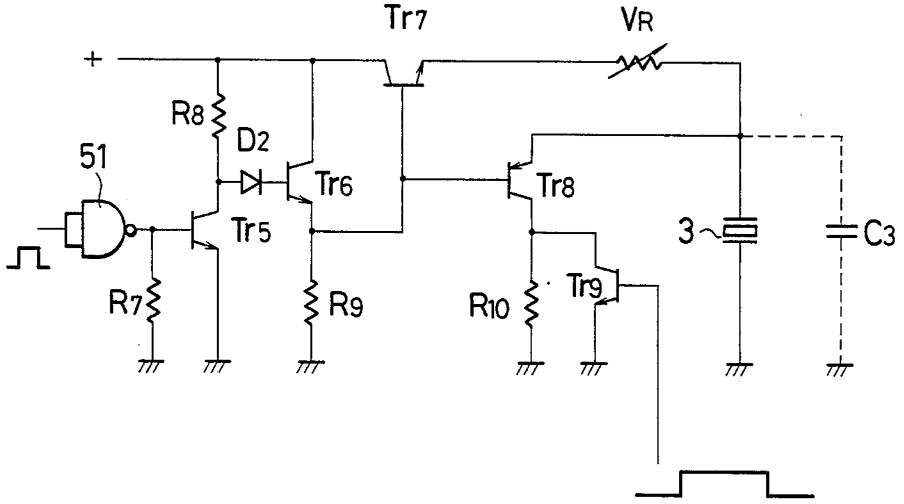
FIG. 9 is a circuit diagram showing the detailed structure of a modified ink driving circuit which is applicable to the system of FIG. 3.

FIG. 9 shows the ink driving circuit which can apply a drive pulse having a sharp falling end to the piezoelectric element of the pressure member 3. As may have already been noticed, this circuit corresponds to the left half portion of the structure shown in FIG. 4. However, in the case of the structure of FIG. 4, the charges accumulated on the piezoelectric element 3 are discharged through resistors $R_3$ and $R_2$ and therefore the returning motion of the pressure member is governed by the time constant determined by the capacitance of the piezoelectric element and these resistors. In such a structure, the rising and falling ends of a drive pulse can not be controlled separately.

The ink driving circuit shown in FIG. 9 comprises a NAND gate 51 having its two inputs connected to receive a signal pulse and its output connected to ground through a resistor $R_7$ and also to the base of an NPN transistor $Tr_5$ whose emitter is grounded. The collector of the transistor $Tr_5$ is connected to the positive d.c. voltage source via a resistor $R_8$, and it is also connected to the base of an NPN transistor $Tr_6$ through a diode $D_2$. The transistor $Tr_6$ has its collector connected to the voltage source and its emitter connected to ground via a resistor $R_9$ and also to the bases of an NPN transistor $Tr_7$ and of a PNP transistor $Tr_8$. The transistor $Tr_7$ has its collector connected to the voltage source and its emitter connected to the top side of the piezoelectric element 3 through a variable resistor $V_R$. On the other hand, the transistor $Tr_8$ has its emitter connected to the top side of the element 3 and its collector connected to one end of a resistor $R_{10}$, the other end of which is grounded, and also to the collector of an NPN transistor $Tr_9$ whose emitter is grounded. The base of the transistor $Tr_9$ forms another input for receiving an enable pulse which causes the transistor $Tr_9$ to be on for a predetermined period of time.

In operation of the circuit of FIG. 9, when a signal pulse is applied to the input of the NAND gate 51, the transistor $Tr_5$ is turned off and thus the transistors $Tr_6$ and $Tr_7$ are turned on so that the piezoelectric element 3 is driven by a drive pulse having a rising characteristic governed by the time constant determined by the resistance of the variable resistor $V_R$ and the capacitance of the element 3. Upon termination of the signal pulse to the NAND gate 51, the transistor $Tr_5$ is turned on and then the transistors $Tr_6$ and $Tr_7$ are turned off and at the same time the transistor $Tr_8$ is turned on since its emitter-base junction comes to be forward biased by the charges accumulated on the capacitance of the element 3. As a result, the piezoelectic element 3 begins its returning motion to the original position. At this juncture, if an enable pulse is applied to the base of the transistor $Tr_9$, the accumulated charges are rapidly discharged to ground through the transistors $Tr_8$ and $Tr_9$ and therefore the pressure member 3 may move to the original position very quickly. Such a quick returning motion of the pressure member 3 will produce a negative pressure inside the ink chamber 4 thereby allowing to pull the air-ink boundary into the chamber 4.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims. For example, the present invention is not limited to the on-demand type ink jet printers, but it may also be applied to other types of ink jet printers.

What is claimed is:

1. An ink jet printing system for printing an image in the form of dots of ink droplets on a recording medium comprising:

a nozzle defining an ink chamber for containing a quantity of ink, said nozzle being provided with an ink discharging hole through which the ink is discharged out into the atmosphere;

an ink reservoir connected to a supply side of said nozzle for supplying ink to said nozzle;

ink drive means for driving the ink inside said ink chamber to be discharged through said ink discharging hole;

detecting means connected to said ink drive means for detecting the fact that the amount of air bubbles trapped in the ink inside said ink chamber has reached a predetermined level; and ink drawing means with a first state of non-activation and a second state of activation as responsive to said detecting means and connected to said nozzle for temporarily drawing said ink in said nozzle such that an air-ink boundary defined between the atmosphere and said ink in said nozzle is pulled into said ink chamber over a predetermined distance thereby transferring the air bubbles in said ink to the atmosphere, said ink drawing means being returned to its first state after a predetermined time period has elapsed so that said ink chamber can be filled with ink free of air bubbles.

2. The system of claim 1 wherein said ink drive means comprises a deflectable pressure member forming a part of said ink chamber and an ink driving circuit which controls the deflection of said pressure member.

3. The system of claim 2 wherein said pressure member comprises a piezoelectric element electrically connected to receive a drive pulse from said ink driving circuit.

4. The system of claim 3 wherein said detecting means comprises a filter circuit for extracting oscillating components from the terminals of said piezoelectric element, a rectifying circuit for rectifying the thus extracted oscillating components and a comparator having one input connected to receive the thus rectified voltage and another input connected to receive a reference voltage, said comparator supplies a high output signal when said rectified voltage exceeds said reference voltage in level.

5. The system of claim 4 wherein said reference voltage is adjustable.

6. The system of claim 4 or 5 wherein said detecting means further comprises a Zener diode with its cathode connected to one side of said piezoelectric element and its anode connected to transfer a signal to said filter circuit.

7. The system of claim 1 or 4 wherein said drawing means comprises a cylinder in fluid communication with the ink supply line between said nozzle and ink reservoir, a piston slidably housed in said piston, moving means for moving said piston in said cylinder and control circuit for controlling the operation of said moving means in response to a signal supplied from said detecting means.

8. The system of claim 7 wherein said moving means includes a spring for normally biasing said piston in a predetermined direction and a solenoid which is energized to retract said piston against the force of said spring when said control circuit receives the output signal from said detecting means.

9. The system of claim 8 wherein said control means includes a mono-multi-vibrator which is turned on for a predetermined time period when the output signal is supplied from said detecting means.

10. The system of claim 1 further comprising a three-way valve provided at the intersection of the ink supply lines each extending from said nozzle, said ink reservoir and said ink drawing means.

11. The system of claim 10 wherein said three-way valve is operated such that when said drawing means is in the drawing mode, said drawing means is first set in fluid communication to said nozzle and then switched to said ink reservoir to receive a supply of ink; whereas, said drawing means is set in fluid communication to said nozzle while said drawing means is returning to its original state.

12. The system of claim 1 wherein the ink chamber of said nozzle is so shaped that the air bubbles formed in the ink in said ink chamber come to be located in the vicinity of said ink discharging hole owing to their own buoyancy with respect to said ink.

* * * * *